United States Patent [19]
Wray

[11] Patent Number: 4,884,359
[45] Date of Patent: Dec. 5, 1989

[54] FISHING LURE

[76] Inventor: Charles D. Wray, 64 Roehampton, Apt. 301, St. Catharines, Ontario, Canada, L2M7P5

[21] Appl. No.: 292,102

[22] Filed: Dec. 30, 1988

[51] Int. Cl.[4] ............................................. A01K 85/00
[52] U.S. Cl. ................................... 43/42.19; 43/42.43
[58] Field of Search ................. 43/42.11, 42.12, 42.13, 43/42.14, 42.15, 42.16, 42.17, 42.18, 42.19, 42.5, 42.43, 43.6

[56] References Cited

U.S. PATENT DOCUMENTS

| | | | |
|---|---|---|---|
| 465,704 | 12/1891 | Skinner | 43/42.19 |
| 2,603,024 | 7/1952 | Pollard | 43/42.19 |
| 2,774,171 | 12/1956 | Pulver | 43/42.19 |
| 2,796,695 | 6/1957 | Meulnart | 43/42.19 |
| 2,977,708 | 4/1961 | Mills | 43/42.19 |
| 3,775,892 | 12/1973 | Bennetts | 43/42.14 |
| 4,208,824 | 6/1980 | Maxwell | 43/42.19 |

Primary Examiner—Richard K. Seidel
Assistant Examiner—William Scott Andes
Attorney, Agent, or Firm—Lloyd M. Forster

[57] ABSTRACT

Fishing lure of the spinning blade type having a loop ended wire passing through a clevis, a series of loose metal and plastic elements to a multipronged hook with a spoon shaped blade attached to the clevis through a hole in the tip end, particularly characterized by a bend in the tip end of the blade to promote vibration and desired spacing from the hooks as well as extension of the blade to the level of the hook prongs to promote a weedless effect.

3 Claims, 1 Drawing Sheet

U.S. Patent   Dec. 5, 1989   4,884,359
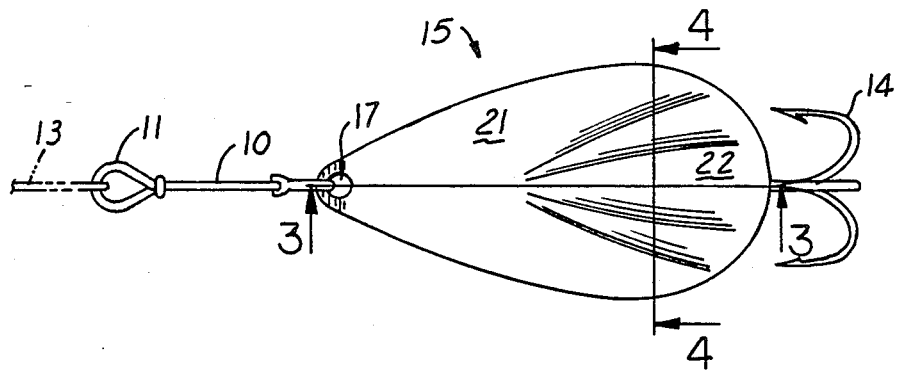
FIG.1
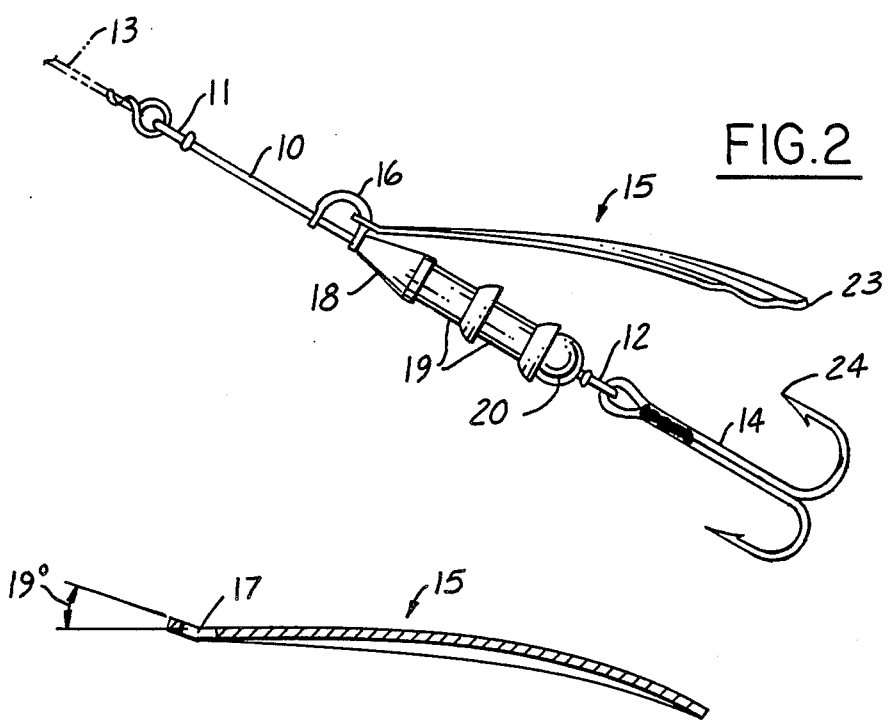
FIG.2
FIG.3
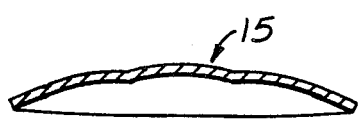
FIG.4

FISHING LURE

BACKGROUND OF THE INVENTION

Fishing lures of the general type disclosed in the present application are known in the art and have been successfully used in various sizes and with various coloring patterns on a spinning blade; also with various combinations of brass and silver elements and a colored bead on the hook line.

BRIEF DESCRIPTION OF THE PRESENT INVENTION

Two significant improvements have made this lure substantially more successful in operation. A certain degree of bend at the attachment tip of the blade has effectively increased the angle of operation in the water relative to the hook line and substantially increased its vibration during passage through the water serving to increase attraction to all sizes of fish.

An additional feature providing a clevis blade suspension such that the extremity of the blade substantially coinicides with the level of multiprong hook tips results in significant improvement in weedless effect.

BRIEF DESCRIPTION OF THE DRAWINGS

FIG. 1 is an elevation illustrating the fishing lure in a horizontal attitude facing the blade as it would appear while being drawn through water;

FIG. 2 is an edge view of the blade and hook assembly taken at approximately right angles to the view of FIG. 1;

FIG. 3 is a sectional view taken along the line 3—3 of FIG. 1;

FIG. 4 is a sectional view taken along the line 4—4 of FIG. 1.

DETAILED DESCRIPTION OF PREFERRED EMBODIMENT

The fishing lure of the present application comprises an assembly of conventional elements including wire 10, having formed end loops 11 and 12 for attachment respectively to fishing line 13 and three pronged hook 14; metal spoon faced curved blade 15, attached to clevis 16 through hole 17 with its convex surface facing outwardly from the axial line of wire 10, loosely strung metal elements in the form of cone 18, and a pair of bells 19; and plastic ball 20.

Metal blade 15 may be variously and differently colored in its smooth area 21 and scalloped area 22 or may be uniformly colored in optional patterns, while elements 18 and 19 may be brass or silver or a combination of brass and silver combined with an orange plastic bead 20.

With particular reference to FIG. 3, an important feature of the invention is illustrated at the 19° sharp bend passing transversely through the center of hole 17. This has been found in developmental use to be critical in producing improved vibrational spinning of the blade in passing through water, together with an increased angular relationship relative to the line of wire 10 which may vary in action from the position shown in FIG. 2 to a close clearance position of blade end 23 relative to hook point 24. When combined with the spinning action of blade 15, the such close proximity contributes to weedless effect in the operation of the fishing lure.

The latter described features: (1) the 19° bend at connecting hole 17, and (2) the extension of blade 15 to the level of hook points 24, have been found in extensive experimental use to contribute important improvement in the effective operation of the lure and surprisingly positive results in winning fishing contests.

I claim:
1. A fishing lure comprising:
   a wire having a loop at a forward end for attachment to a fishing line and a loop at a rearward end with a multipronged hook secured thereto, and a plurality of loosely strung elements intermediate its length; and
   a vibrating spoon-shaped blade means for producing vibrations to attract fish, said blade means being secured to said wire by a clevis passing through a hole in said blade means at a forward end thereof;
   said blade means further including a first portion oriented parallel to said wire and extending forwardly from said hole and an arcuate second portion extending rearwardly and outwardly from said hole forming a transverse bend at said hole and having a convex surface facing outwardly away from said wire.
2. Fishing lure of claim 1 wherein the operating position of the blade extremity when said clevis and elements strung on the wire are stacked together is at a level substantially corresponding to and operational in close clearance proximity with the tip ends of said multipronged hook.
3. Fishing lure of claim 1 wherein said bend is approximately 19°.

* * * * *